United States Patent
Chanda et al.

(10) Patent No.: US 10,175,547 B2
(45) Date of Patent: Jan. 8, 2019

(54) DYNAMICALLY TUNABLE, SINGLE PIXEL FULL-COLOR PLASMONIC DISPLAY, METHOD AND APPLICATIONS

(71) Applicant: UNIVERSITY OF CENTRAL FLORIDA RESEARCH FOUNDATION, INC., Orlando, FL (US)

(72) Inventors: Debashis Chanda, Orlando, FL (US); Daniel Franklin, Orlando, FL (US)

(73) Assignee: UNIVERSITY OF CENTRAL FLORIDA RESEARCH FOUNDATION, INC., Orlando, FL (US)

(*) Notice: Subject to any disclaimer, the term of this patent is extended or adjusted under 35 U.S.C. 154(b) by 0 days.

(21) Appl. No.: 15/945,184

(22) Filed: Apr. 4, 2018

(65) Prior Publication Data
US 2018/0284509 A1   Oct. 4, 2018

Related U.S. Application Data

(60) Provisional application No. 62/481,178, filed on Apr. 4, 2017.

(51) Int. Cl.
*G02F 1/13* (2006.01)
*G02F 1/1335* (2006.01)
(Continued)

(52) U.S. Cl.
CPC ...... *G02F 1/1395* (2013.01); *G02F 1/133533* (2013.01); *G02F 1/133604* (2013.01); *B82Y 20/00* (2013.01)

(58) Field of Classification Search
CPC ............. G02F 1/1395; G02F 1/133533; G02F 1/133604; B82Y 20/00
See application file for complete search history.

(56) References Cited

U.S. PATENT DOCUMENTS

2005/0146724 A1* 7/2005 Malak .................... B82Y 10/00
356/445
2007/0042505 A1   2/2007 Israel et al.
(Continued)

OTHER PUBLICATIONS

Notification of Transmittal of the International Search Report and the Written Opinion of the International Searching Authority, International Search Report, and Written Opinion of the International Searching Authority; Forms PCT/ISA/220, PCT/ISA/210, and PCT/ISA/237; dated Jun. 22, 2018; 6 pages.

*Primary Examiner* — Nathanael R Briggs
(74) *Attorney, Agent, or Firm* — Bond Schoeneck & King, PLLC; George McGuire

(57) ABSTRACT

Dynamic, color-changing surfaces have many applications including but not limited to displays, wearables, and active camouflage. Plasmonic nanostructures can fill this role with the advantages of ultra-small pixels, high reflectivity, and post-fabrication tuning through control of the surrounding media. However, while post-fabrication tuning have yet to cover a full red-green-blue (RGB) color basis set with a single nanostructure of singular dimensions, the present invention contemplates a novel LC-based apparatus and methods that enable such tuning and demonstrates a liquid crystal-plasmonic system that covers the full red/green/blue (RGB) color basis set, as a function only of voltage. This is accomplished through a surface morphology-induced, polarization dependent, plasmonic resonance and a combination of bulk and surface liquid crystal effects that manifest at different voltages. The resulting LC-plasmonic system provides an unprecedented color range for a single plasmonic nanostructure, eliminating the need for the three spatially static sub-pixels of current displays. The system's compatibility with existing LCD technology is possible by integrating it with a commercially available thin-film-transistor (Continued)

(TFT) array. The imprinted surface readily interfaces with computers to display images as well as video.

17 Claims, 13 Drawing Sheets

(51) Int. Cl.
*G02F 1/139* (2006.01)
*B82Y 20/00* (2011.01)

(56) References Cited

U.S. PATENT DOCUMENTS

| | | |
|---|---|---|
| 2007/0099249 A1 | 5/2007 | Abbott et al. |
| 2008/0129929 A1 | 6/2008 | Miyachi et al. |
| 2014/0029104 A1 | 1/2014 | Guo et al. |
| 2014/0139794 A1 | 5/2014 | Ohnishi et al. |
| 2017/0322457 A1 | 11/2017 | Chanda et al. |

\* cited by examiner

0 V/μm 1.25 V/μm 2.5 V/μm

10 V/μm

DYNAMICALLY TUNABLE, SINGLE PIXEL FULL-COLOR PLASMONIC DISPLAY, METHOD AND APPLICATIONS

CROSS-REFERENCE TO RELATED APPLICATION

The present application relates and claims priority to U.S. Provisional Patent Application Ser. No. 62/481,178, filed Apr. 4, 2017, the entirety of which is hereby incorporated by reference.

STATEMENT OF GOVERNMENT INTEREST

Funding for the invention was provided by the National Science Foundation under award NSF ECCS-1509729. The U.S. government has certain rights in the invention.

BACKGROUND

Aspects and embodiments of the invention pertain to nanostructured, plasmonic-enabled, liquid crystal (LC) display apparatus and methods, and more particularly to a voltage-controlled liquid crystal-plasmonic display apparatus, methods, and applications, that cover the full RGB color basis set with a single nanostructure of singular dimensions.

Structural color arising from plasmonic nanomaterials and surfaces has received ever increasing attention. The drive to commercialize these systems has led to significant improvements in color quality, angle independence, brightness, and post-fabrication tunability. However, while most of these advances struggle to replace present commercially available technologies, the ability to change color, post-fabrication, is a distinct advantage of plasmonic systems, which may allow them to advantageously fill niche applications. For example, traditional transmissive and reflective displays typically have three sub-pixel regions with static red, green and blue color filters. These sub-pixels control the amount of each basis color transmitted or absorbed to create arbitrary colors through a process called color mixing.

A display built from a dynamic color-changing surface can eliminate the need for individual sub-pixels, increasing resolution by 3× without reducing pixel dimensions. However, previous reports of post-fabrication plasmonic tuning have yet to span an entire color basis set (RGB or CYM) with a single nanostructure.

In Applicant's previous work (described in PCT/US2015/056373), a nanostructured, plasmonic-enabled, color generation apparatus is disclosed that could only span two of the three RGB values for a single nanostructure. In order to cover the entire color set, multiple nanostructures were required.

SUMMARY OF THE INVENTION

According to the embodied invention, we demonstrate a reflective color-changing surface capable of producing the full RGB color basis set, all as a function of voltage only, and based on a single nanostructure. This is achieved through the onset of surface roughness-induced polarization dependence and a combination of interfacial and bulk LC effects. Each of these phenomenon dictates the color of the surface within different voltage regimes: bulk LC reorientation leading to polarization rotation in the low voltage regime, and surface LC reorientation leading to plasmonic resonance shifting at higher voltages. This hybrid LC-plasmonic tuning mechanism is modeled through a combination of finite element (FEM), Jones calculus, and finite difference time domain (FDTD) simulation techniques. Lastly, the scalability and compatibility of this system with existing LCD technology through integration with a TFT array is demonstrated. The resultant device is then interfaced with a computer to display arbitrary images and video. This work demonstrates the potential of hybrid LC-plasmonic systems for single pixel, full-color, high resolution displays and color changing surfaces.

DETAILED DESCRIPTION

Liquid Crystal-Plasmonic Device

Figure 1:
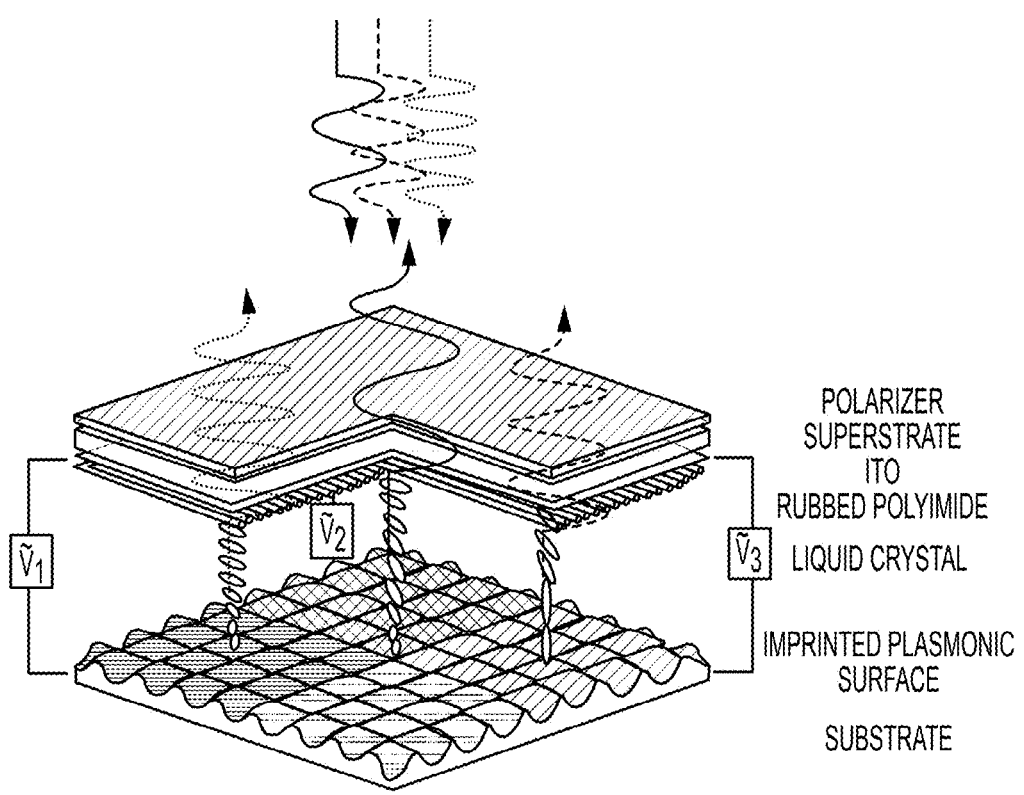
FIG. 1 is an schematic representation of an illustrative embodiment of a liquid crystal-plasmonic apparatus.

A schematic of the liquid crystal-plasmonic apparatus is shown in FIG. 1. At the top of the device, unpolarized ambient light passes through a linear polarizer, glass superstrate, indium tin oxide (ITO), and a rubbed polyimide film. The ITO serves as a transparent electrode for applying electric fields across the liquid crystal, and the rubbed polyimide aligns the LC parallel to the axis it is rubbed (homogeneous alignment). The polarized light continues through a high birefringence LC layer (LCM1107, LC Matter Corp.) and excites grating coupled surface plasmons (GSCP) on the nanostructured aluminum surface. The LC orientation near the plasmonic surface determines the effective refractive index of the GCSP modes and, therefore, the resonant wavelength. Light that is not absorbed by the nanostructure is reflected back from the device resulting in a perceived color. The plasmonic surface constitutes the second half of the LC cell and is fabricated through the nanoimprint lithography of a 300 nm period nanowell array with an impression depth of 80 nm, which is followed by a 30 nm-thick aluminum electron beam evaporation. By changing deposition conditions and substrate temperatures the surface quality and oxide content of the film can be greatly varied. This creates a relatively rough aluminum surface (~35 nm rms), which induces a polarization dependence on the GSCP resonance in the presence of an anisotropic media, whereas it was shown in Applicant's previous work (id.) that a smooth surface (~10 nm rms) results in near polarization independence. This results in the device having two orthogonal color states in the "voltage off" state ($V_{off}$), depending on the polarization of exciting light either parallel (blue) or perpendicular (red) to the LC director near the nanostructure. Also from this previous work, we found the periodic nanowell structure imparts a weak diagonal alignment on the LC with respect to the structure's grating vectors. We use this to create a 45° twisted nematic cell by aligning the top rubbed polyimide layer with one of the grating vectors of the nanostructure. By applying a voltage across the plasmonic film and the top ITO, the orientation of the LC throughout the cell is controlled. At intermediate voltages, the bulk LC reorients and retards the incident light resulting in a partial excitation of the surface's two orthogonal "off-state" modes. At a specific voltage ($V_{th}$), however, the polarization is effectively rotated to excite the opposite plasmonic mode, marking a transition in color from red to blue or blue to red. This birefringent effect is wavelength dependent and can add an oscillatory absorption to the reflection spectra as light is partially absorbed on the second pass through the polarizer. However, we will show below that when the polarizer is aligned in parallel with the LC director, the color of the surface is independent of this effect. At higher voltages the bulk LC saturates vertically while the LC near the aluminum surface begins to reorient, which increases the effective refractive index experienced by the plasmonic nanostructure. This results in a continuously tunable red shift of the GCSP resonance, eventually saturating when the LC near the surface is also completely reoriented by the electric field. In this state ($V_s$), the surface turns green and loses its polarization dependence.

Polarization Dependent Color

Figure 2A:
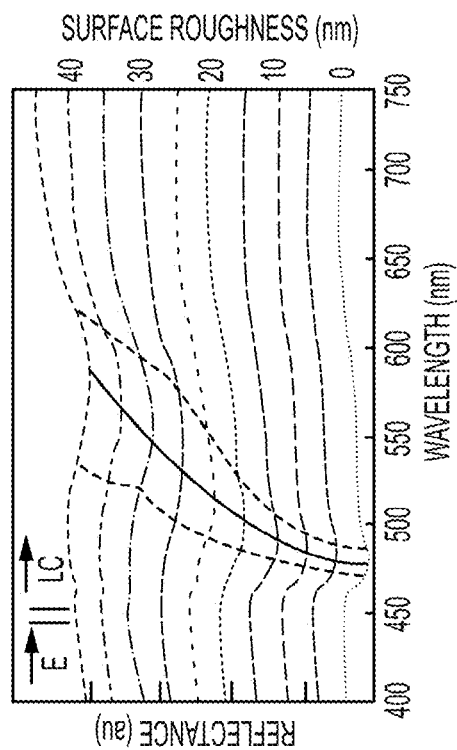
FIG. 2(a) is a reflection spectra for incident light polarized perpendicular (90°) to a liquid crystal long-axis.
Figure 2B:
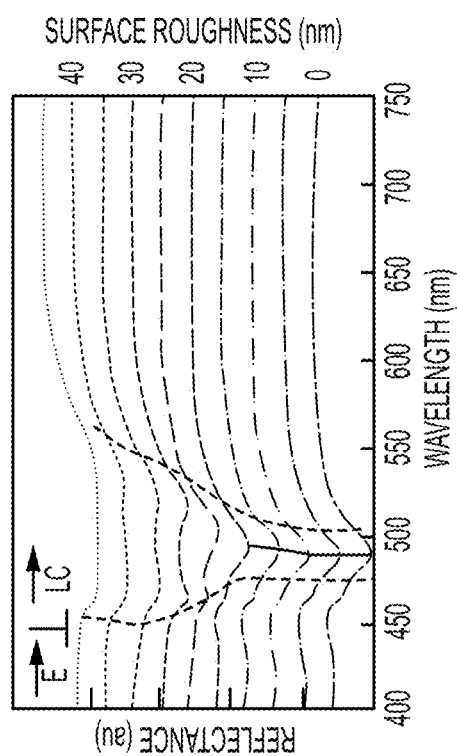
FIG. 2(b) is a reflection spectra for incident light polarized parallel (0°) to a liquid crystal orientation.
Figure 2C:
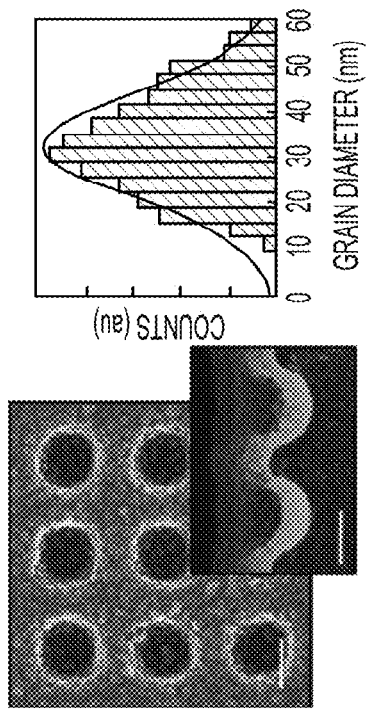
FIG. 2(c) is SEM images and a corresponding histogram of 30 nm "smooth" aluminum film on an imprinted polymer.
Figure 2E:
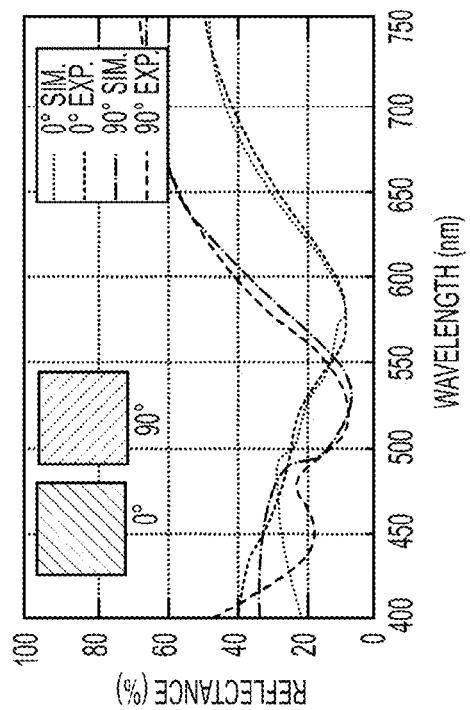
FIG. 2(e) is a reflection spectra compared to a simulated spectra of the "smooth" aluminum film for both the parallel (0°) and perpendicular (90°) incident polarizations.
Figure 2D:
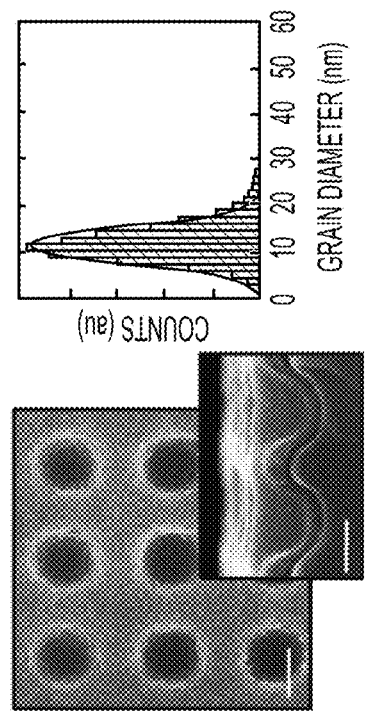
FIG. 2(d) is SEM images and a corresponding histogram of 30 nm "rough" aluminum film on an imprinted polymer.
Figure 2F:
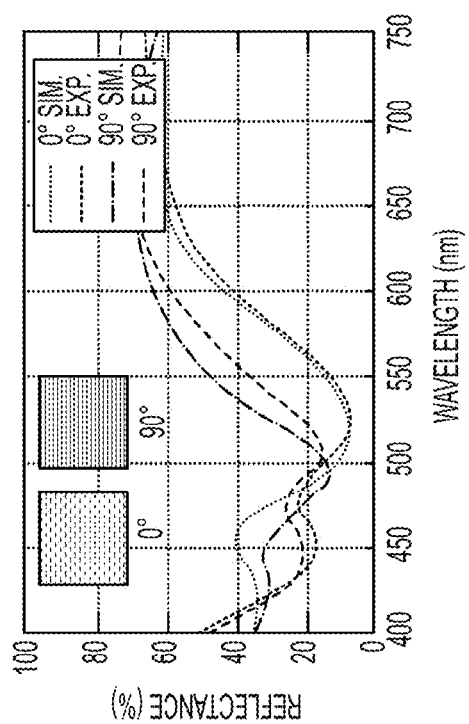
FIG. 2(f) is a reflection spectra compared to a simulated spectra of the "rough" aluminum film for both the parallel (0°) and perpendicular (90°) incident polarizations.
Figure 7:
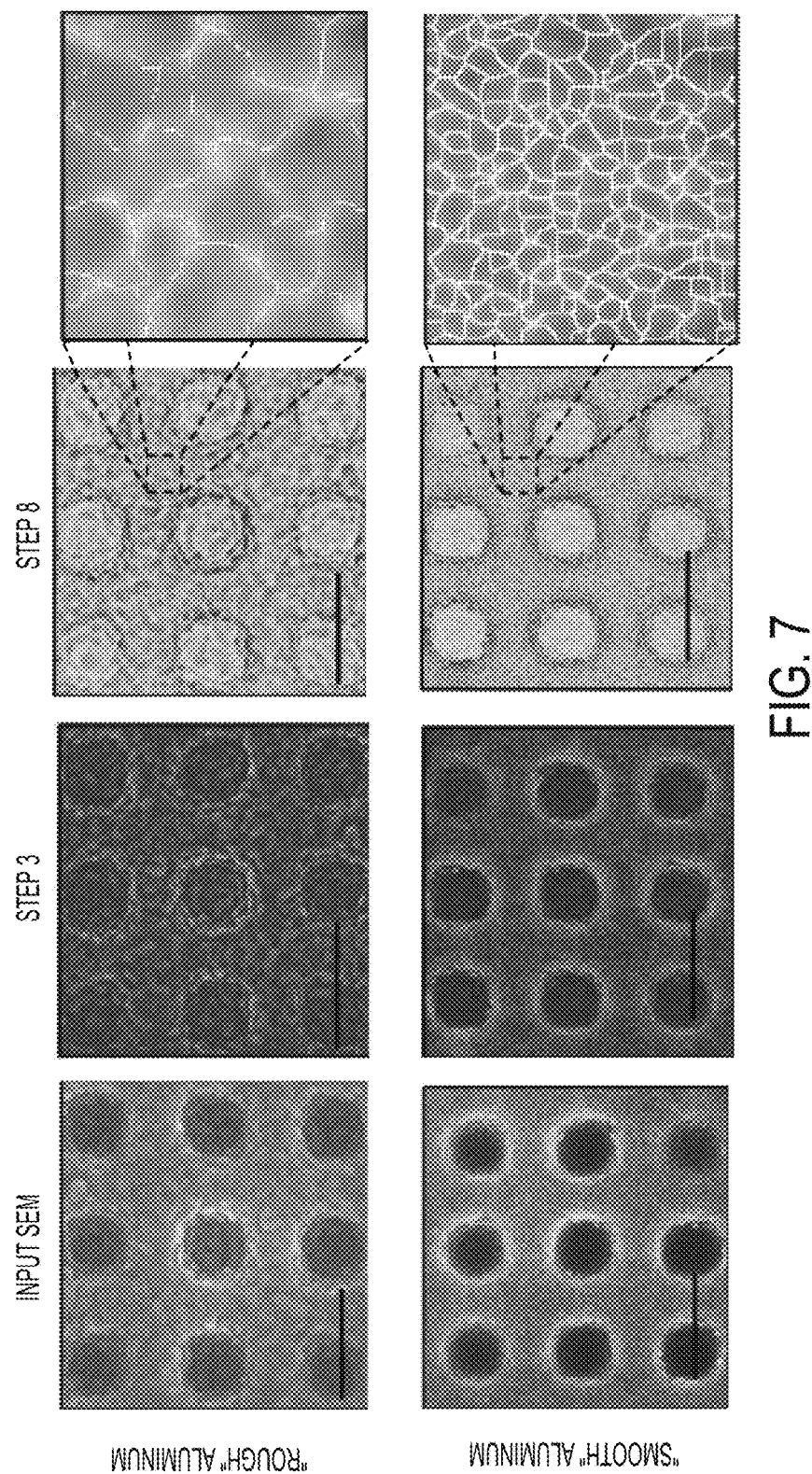
FIG. 7 is a series of SEM images for "rough" and a"smooth" aluminum thin film at various steps of a watershed method.

Surface plasmon resonances depend greatly on the local morphology of the metallic surface and behavior can vary drastically with surface roughness and oxide content. An increase in the roughness of a metal film causes a red-shift in the resonant plasmon wavelengths and is commonly attributed to an increase in scattering. Having a distribution of roughness and grain size within a film will then have a broadening effect on the resonance. While this is normally considered detrimental for plasmonic applications like biomolecular sensing and SERS enhancement, this effect can be used advantageously for plasmonic structural color as structures that absorb broad wavelengths of light are able to produce colors not possible from those with only narrow absorption resonances. To demonstrate the impact of surface roughness on the color reflected from the nanostructure, we perform FDTD simulations of the periodic nanowell array as a function of rms roughness of the aluminum film and use the spectra to predict a reflected color using the CIE color matching functions. Here, we approximate the liquid crystal region as a perfect anisotropic crystal with the slow axis parallel to the surface and at 45° with respect to a periodicity vector of the nanowell array (homogeneous LC alignment). This isolates the fundamental modes of the plasmonic film from the bulk retardation/polarization rotation effects of the LC. The results for incident light polarized perpendicular to the liquid crystal long-axis (90°) is shown in FIG. 2(a), while incident light polarized parallel (0°) to the liquid crystal orientation is shown in FIG. 2(b). Line colors are determined by the CIE color matching functions and are cascaded to show the influence of surface roughness on resonance location (solid black lines) and full-width-half-maximum (dotted black lines). At low values of surface roughness the plasmonic resonance shifts less than 20 nm upon incident polarization rotation, resulting in a minute color change. However, as the roughness of the aluminum increases the parallel resonance red shifts more than the perpendicular case causing a greater color shift between the two polarization states as can be seen from FIG. 2a-b. We explain this phenomenon with the following argument: as plasmonic resonances depend on the surface normal component of the surrounding refractive index, a rough film will have local regions where the surface norm has an increased x or y component compared to the global norm. This gives the in-plane components of the surrounding media a greater contribution to the effective refractive index of the GSCP resonance. In the current case, where the surrounding media is a uniaxial crystal oriented parallel to the aluminum surface, this creates a surface roughness induced polarization dependence of the plasmonic resonance. This effect has been experimentally demonstrated with two surface morphologies labelled as A and B that are obtained by controlling deposition parameters and substrate temperatures, detailed descriptions of which can be found in the Methods section herein below. The corresponding top and cross-sectional scanning electron microscope images of the 30 nm aluminum films on the imprinted polymer are shown in FIG. 2(c-d). A watershed-based image segmentation method is used to find the distribution of grain diameters from the top-view SEM images (FIG. 2(c-d)). This method is described in detail in FIG. 7. In FIG. 7, the input SEM images for the "rough" and "smooth" aluminum thin film are shown at various steps in the watershed-based image segmentation method. The method results in a list of regions with the number of pixels contained therein. The area of each region is then converted into an approximate grain diameter. Thereafter, the regions are mapped back onto the image in the form of white lines to confirm the methods functionality. Histograms of the two surfaces show a mean grain diameter of 12 nm for the "A" surface (FIG. 2(c)) and 33 nm for the "B" aluminum surface (FIG. 2(d)). The surfaces are then made into LC cells and infiltrated with LCM1107. FIG. 2(e-f) shows the resulting reflection spectra of the respective surfaces (solid lines) compared to simulated spectra (dotted lines) for incident polarizations parallel (0°) and perpendicular (90°) to the top rubbed polyimide alignment layer. Output light of all polarizations is collected to ensure the spectra originate purely from the plasmonic surface. Line colors of the spectra are generated by the CIE color matching method while the microscope image insets show the experimentally achieved colors. The histograms of the respective aluminum surfaces are used in a weighted average of the FDTD spectra of FIG. 2(a-b) and result in a close matching to the experimental spectra. The relief depth of the structure in FDTD simulations has also been varied between 80-90 nm to provide a better matching to experimental spectra and account for small variances in the imprinting process. The relatively smooth aluminum film, A, gives a small change in color upon polarization rotation, from an orange to a reddish-orange, associated with a 20 nm shift in GSCP resonance. On the contrary, the aluminum surface, B, with higher surface roughness gives a more drastic color change upon polarization rotation, from blue to red (FIG. 2(f)) and is the result of a 60 nm shift in resonant wavelength. Hence, by controlling the surface morphology via deposition conditions, the degree of polarization dependence of the resultant color can be controlled. Exciting the surface with polarization angles between 0° and 90° or unpolarized light results in a superposition of these two spectra (FIG. 8(a-b)). An example of this is that the surface B when excited with unpolarized light results in a purple color (FIG. 8(c)).

Liquid Crystal Phase Retardation

Figures 3A, 3B, 3C, 3D, 3E:
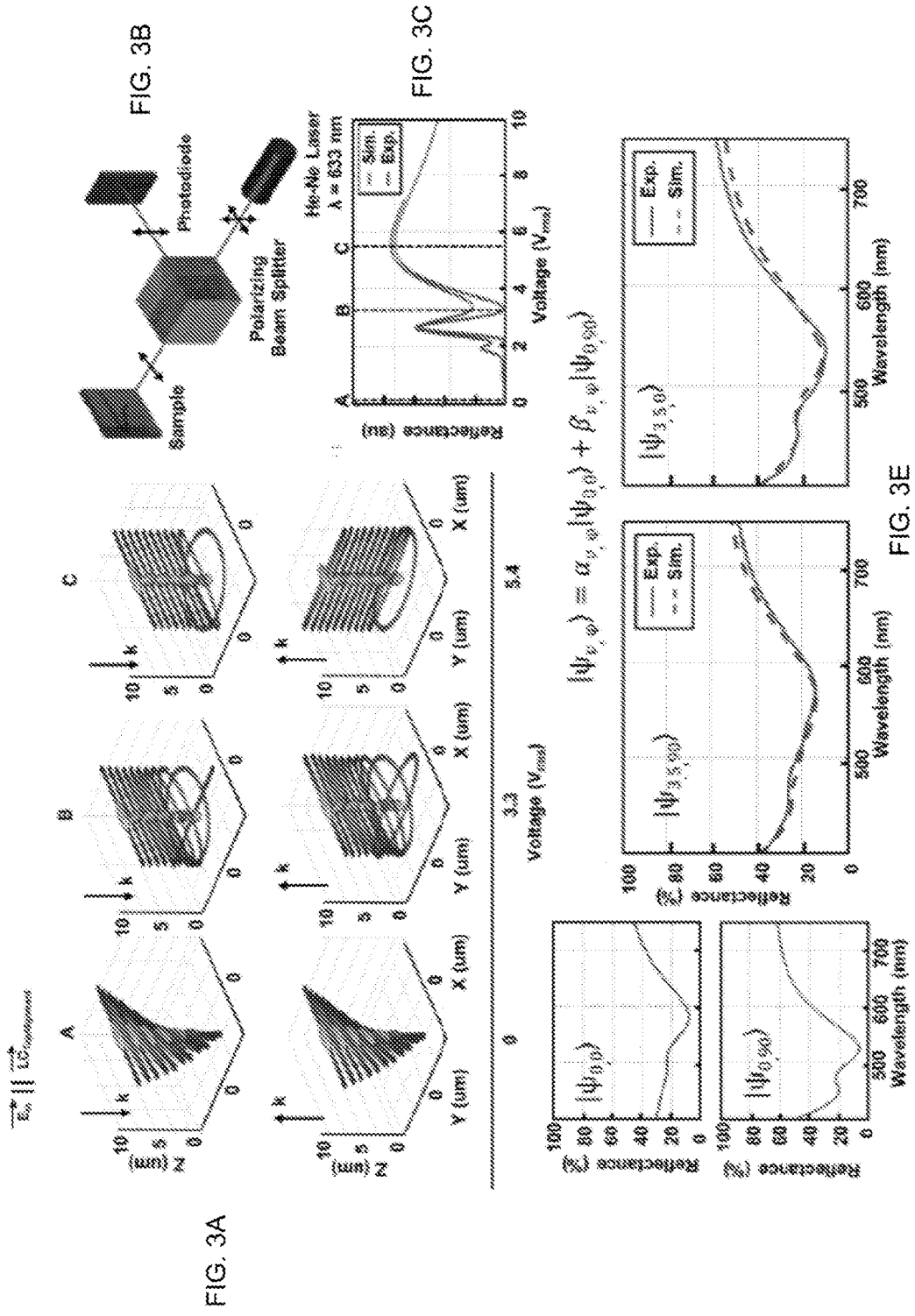
FIG. 3(a) is a schematic representation of the liquid crystal and light polarization through a cell at three selected voltages.
FIG. 3(b) is a schematic representation of an experimental setup to verify liquid crystal orientation throughout a cell.
FIG. 3(c) is a graph depicting the degree of polarization rotation imparted on the light as a function of voltage.
FIG. 3(d) is a reflection spectra of two orthogonal off states of the plasmonic surface when excited with parallel and perpendicular light with respect to a liquid crystal director.
FIG. 3(e) is a reflection spectra of a surface in a low applied field regime and a simulated spectra obtained by a superposition of two plasmonic modes.

To achieve all three basis colors (RGB) as a function only of voltage a combination of bulk and surface liquid crystal effects are utilized. The periodic nanowell structure imparts a weak diagonal alignment on the LC with respect to the structure's grating vectors, which is used to create a 45° twisted nematic cell by aligning the top rubbed polyimide layer with one of the grating vectors of the nanostructure. A cell gap of 8.5 µm ensures the alignment of the top polyimide does not overpower that of the nanostructure to result in a homogeneous cell. These boundary conditions, along with the LC material parameters are used in FEM simulations (TechWiz LCD 3D, Sanayi) to find the LC director throughout the cell as a function of voltage. A Jones matrix approach is then used to find the polarization of light as it propagates through the cell. This is done by approximating the LC cell as a stack of N number of phase plates with a continuous variation in retardation. The LC director at that cell location determines the anisotropic refractive index of each layer. A detailed description of the process is provided herein below. The resulting LC directors and polarization ellipse throughout the cell for three selected voltages are represented in FIG. 3(a). While the FEM and Jones matrix calculations are found to converge with N=100, the figures in FIG. 3(a) depict a gridded subsampling for graphical purposes. The top row shows incident polarized light parallel to the top LC director as it propagates down towards the nanostructure, while the bottom row depicts the light after reflection and as it propagates out of the cell. At V=0 (A), the LC creates a 45° twisted nematic cell where the propagating light maintains its linear polarization and is rotated by the LC director in what's known as the Maugin (or Waveguiding) regime. This is given by the following condition:

$$\phi << \frac{2\pi}{\lambda} \Delta n d,$$

where φ is the twist angle of the cell, Δn is the birefringence of the LC, λ is the wavelength of light, and d is the thickness of the LC cell. Here we can see that light exits the cell with the same polarization as input and is, therefore, unaffected by a second pass through the polarizer. As voltage is increased, the Fredericks transition marks the initial tilt of the LC from their voltage-off state and is followed by a continuous change in tilt along the applied electric field. This tilting reduces the effective Δn of the cell, which eventually breaks the Maugin condition and begins changing the ellipticity of the light, as can be seen in (B) and (C) of FIG. 3(a). To verify this LC mode, we use the experimental setup illustrated in FIG. 3(b) and compare with simulations from the combined FEM-Jones approach. The experiment consists of light from a He—Ne laser that passes through a polarizing beam splitter (PBS) and is incident upon the plasmonic-LC device. In this case, the polarization of incident light is parallel to the rubbing of the top alignment layer. Light is reflected from the device and back into the PBS, which reflects the orthogonal polarization of light to a silicon photodiode. A voltage is then adiabatically applied to the sample at a rate of 0.01 Vs$^{-1}$, well below that of the cell's transient optical effects. The results of the experiment are shown in FIG. 3(c) and represent the degree of polarization rotation imparted on the light as a function of voltage. Jones matrix simulations of a 45° twisted nematic cell with a parallel input polarizer and perpendicular output analyzer (both with respect to the top LC director) match well with the experimental curve. A close to zero reflection indicates that the light is leaving the cell with the same polarization as it entered. This can only occur if the light reflects off the plasmonic surface in a linear polarization state, as can be seen in the selected voltage cases (A) and (B). On the contrary, peaks in the curve indicate voltages at which light leaves the cell at a perpendicular polarization than as it entered, which occurs due to the change in hand of reflected circular polarized light (C). While this verifies the bulk LC mechanics of the cell, to understand this effect's impact on the color of reflected light we look at the polarization of light as it excites the plasmonic surface. The two orthogonal modes of the surface-B are shown in FIG. 3(d). These spectra are obtained at 0 V and when the polarization of incident light is parallel (0°) and perpendicular (90°) to the top polyimide alignment layer, respectively. Since the cell is in the Maugin regime at this state, the incident light remains either parallel or perpendicular to the LC director as it excites the plasmonic surface. Within a low-voltage regime, where only the bulk LC changes orientation and the LC near the surface remains constant, the spectra is a linear combination of the two orthogonal basis spectra with a wavelength dependent weighting, α and β. These weighting terms are given by the projection of the electric field exciting the nanostructure on the axes parallel and perpendicular to the LC director, respectively. FIG. 3(e) shows experimentally obtained reflection spectra of the surface with a voltage of 3.5 V (V$_{th}$) where, for a given incident polarization, the spectra flips to the orthogonal state's color. Using the Jones Matrix method to find α and β, the resulting spectra closely match with experiment. Detailed steps for obtaining α and β, as well as their exact values for this case are provided herein below.

Figure 4A:
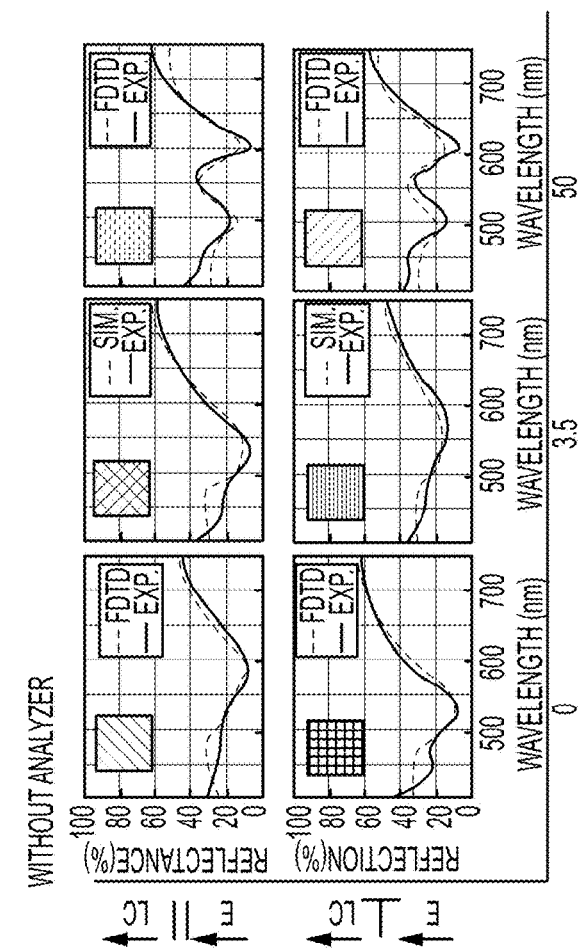
FIG. 4(a) is a measured and simulated reflection spectra of a surface as a function of applied field and input polarization.
Figure 4B:
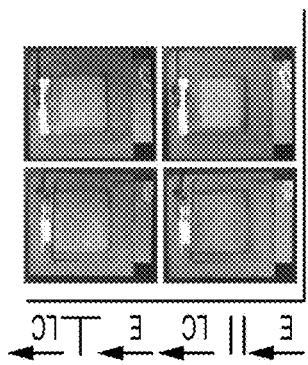
FIG. 4(b) is camera images of a large area sample through a polarizing film for selected polarizations and voltages.
Figure 4C:
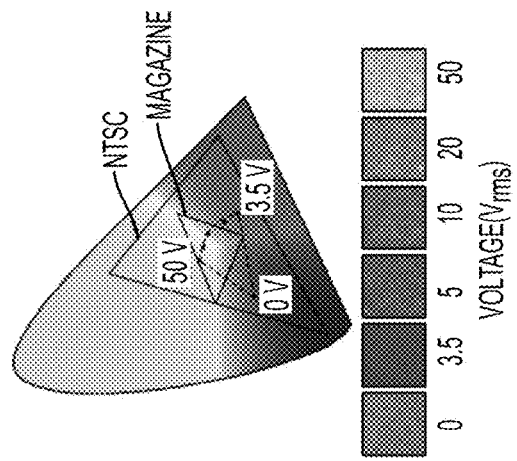
FIG. 4(c) is a CIE chromaticity diagram and microscope images of a surface as a function of voltage when the polarizer, liquid crystal director, and analyzer are parallel.

As voltage is increased, the LC near the nanostructure and within the plasmonic fields of the surface begins to tilt. This increases the effective refractive index of the GCSP modes and continuously red-shifts their resonant wavelengths. Once this occurs, the two state approach used above is no longer valid, but also not needed to predict the device's end-state reflection spectra. At saturation voltage (V$_s$), the LC near the surface becomes asymptotically vertical, which results in the loss of the nanostructure's polarization dependence, as well as the bulk LC's birefringent properties. This is demonstrated in FIG. 4(a) where the voltage and polarization dependent reflection spectra of the device is shown. Again, line colors are generated by overlap integration between the measured spectra and the CIE color matching functions and insets show optical microscope images of the surface. The two top rows of spectra are of the surface when excited with polarized light parallel and perpendicular to the LC alignment director, respectively, and light of all polarizations are collected. While this confirms that the color is generated purely by the plasmonic surface, light from a practical device, in which the polarizer is laminated to the top, would pass through the polarizer a second time. The bottom-most row of spectra in FIG. 4(a) shows the influence of this second pass on the color of the surface as an analyzer is added in parallel with the polarizer. In the off-state, the spectra are invariant to the addition of an analyzer as the LC is in the waveguiding regime as described in FIG. 3(a). For this state, the experimental spectra match closely with the histogram-weighted FDTD spectra. At an applied voltage of 3.5 V, the reflected color flips due to the polarization rotation of incident light as it passes through the LC cell. The simulated spectra for this applied field is obtained by using the wavelength dependent weighting factors, α and β, on the FDTD results at V=0. The second pass through the polarizer is simulated by adding an analyzer to the Jones calculus method. Here, there is a slight change in spectra with the addition of the analyzer, however, the changes do not greatly impact the reflected spectra and color. At saturation voltage (LC on state), the first order plasmonic resonance shifts to 600 nm and a second order resonance moves to 500 nm. This results in a green color reflected from the surface, which can be confirmed by FDTD with an anisotropic media where $n_z=n_e$ and $n_x=n_y=n_o$ of the LC. Here, we also see that the effect of the analyzer is minimal, which is consistent with the LC being nearly vertical throughout the cell. To demonstrate this phenomenon without a microscope we show camera images of a large area sample through a polarizing film in FIG. 4(b) for selected polarizations and voltages. Here, our devices are 1 in$^2$ in area and limited by the size and quality of our existing stamp, however, large area (36 in$^2$) and roll-to-roll nanoimprinting has been demonstrated that could allow scaling of the device to hand-held and notebook dimensions with high pattern fidelity. Another critical aspect of the resultant device is color quality. FIG. 4(c) shows the CIE chromaticity diagram and microscope images of the surface as a function of voltage when the polarizer, LC director and analyzer are parallel. Black dots indicate the coordinates of the reflection spectra and a dotted black line shows the total area the surface could span if integrated in a color-mixing scheme. Due to the absorptive nature of the color generating phenomenon, the color gamut is less than that of the NTSC standard, but comparable in area to that of high quality print magazine (AAAS Science).

Angle Dependence of the LC-Plasmonic System

Figure 5A:
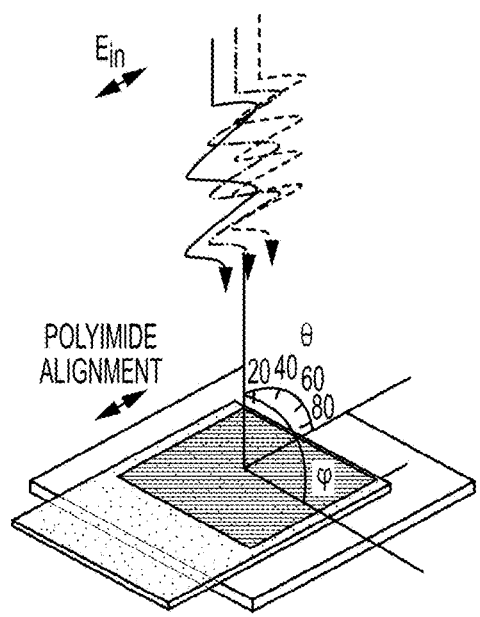
FIG. 5(a) is a schematic representation of the polarization of incident light parallel to the liquid crystal director where the angles of incidence are $\varphi$ and $\theta$.
Figure 5B:
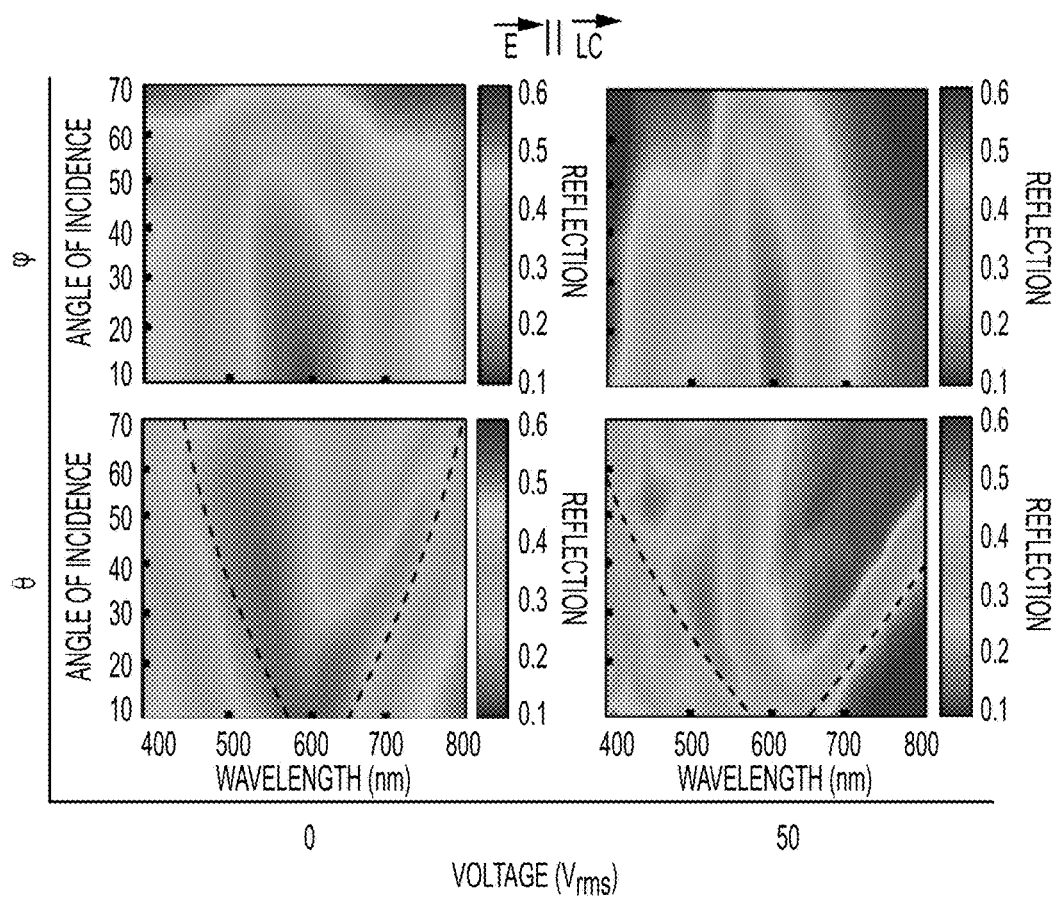
FIG. 5(b) is a graph of experimental measurements when the axis of rotation is parallel ($\varphi$, TE, s-polarized) and perpendicular ($\theta$, TM, polarized) to the incident light.

To add to the fundamental study of the LC-plasmonic system, angle resolved reflection measurements using an integrating sphere with a rotating center mount were performed (RTC-060-SF, Labsphere Inc.). A schematic is shown in FIG. 5(a) and depicts the case where incident light is polarized parallel to the LC director. Two angles of incidence are defined: φ, where the polarization of light is parallel to the axis of rotation (TE, s-polarized), and θ, when the polarization of light is perpendicular to the axis of rotation (TM, p-polarized). For the incident angle φ, there is an expected angle independence from the experimental measurements in FIG. 5(b). However, changes in θ produce a shift in resonant wavelength of the GCSP modes according to $$\frac{\sin}{\lambda} = \pm \frac{1}{\lambda}\sqrt{\frac{\varepsilon_{Al}\varepsilon_{LC}}{\varepsilon_{LC}+\varepsilon_{LC}}} - \frac{m}{P}.$$

Here, θ is the angle of incidence, λ is the resonance wavelength, $\varepsilon_{LC}$ and $\varepsilon_{AL}$ are the dielectric constants of the LC and aluminum, respectively, m is the mode order, and P is the structure periodicity. Black lines depict this GCSP dispersion relation when corrected for refraction at the top glass and LC interfaces. The results of these figures clearly show an area of improvement for a display utilizing this phenomenon. While an ideal display has little dependence on viewing position, this device has an angle independence in one axis of rotation but a dependence in the other.

However, by orienting the display along the preferred viewing angle, the display can be made almost angle independent. Furthermore, through the use of a compensation film or a nanostructure with alternative plasmonic modes, the viewing angle dependence could be improved and optimized.

Active and Passive Addressing Schemes

Figure 6A:
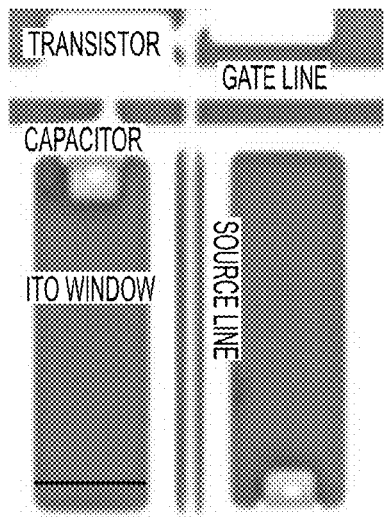
FIG. 6(a) is a microscope image of the plasmonic surface integrated with a thin-film-transistor (TFT) array (10×)
Figure 6B:
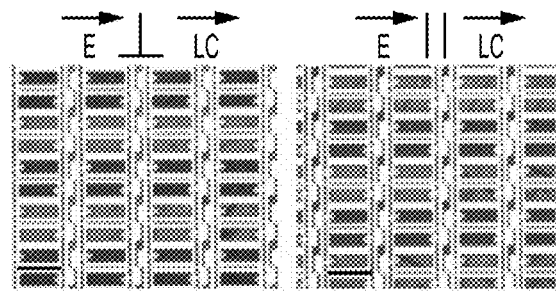
FIG. 6(b) is a depiction of the surface color changes after applying a voltage to every $3^{rd}$ and $4^{th}$ row of the TFT.
Figure 6C:
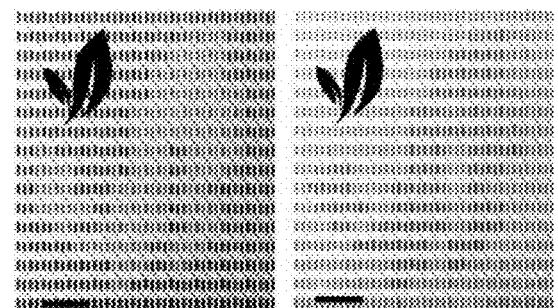
FIG. 6(c) is a pair of full images displayed from the device (4×)
Figure 6D:
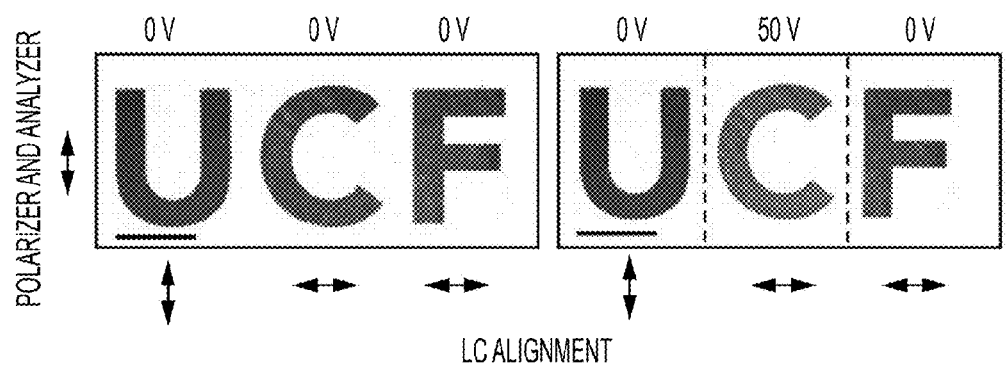
FIG. 6(d) is a passively addressed device with UV lithographically patterned "UCF" as a function of applied, field, polarizer, and analyzer alignment and LC photoalignment director.

Once a color gamut is obtained the system can be combined with various addressing schemes. A critical advantage of the proposed LC-plasmonic system is its facile integration with pre-existing display technologies. To demonstrate this capability, a conventional transmissive TN LCD panel was used (Adafruit, ID: 1680) and isolated the thin film transistor array by removing the back light, polarizers, diffusers and ITO glass. The nanostructured aluminum surface is UV cured onto the TFT glass plate with 8.5 μm spacers and then filled with LCM1107. FIG. 6(a) shows a microscope image of the resulting device (10×) in which the electrical components of the TFT can be clearly seen. Light passes through a polarizer, ITO windows and LC to reflect off the plasmonic surface and back out of the device. The white areas are due to reflection off the metal lines of the TFT. In the voltage-off state, the entire surface is either blue or red, depending on the polarization of incident light with respect to the top LC alignment director. By keeping the electronics of the TFT intact, the device is interfaced with a computer through a HDMI-to-TTL converter. Individual pixels are then controlled through images the computer outputs to the display. FIG. 6(b) shows how the surface changes color by applying a voltage to every $3^{rd}$ and $4^{th}$ row of the TFT. Full images can be displayed as shown in FIG. 6(c). While this shows the ease at which LC-plasmonic systems can be integrated with existing TFTs, the prototype device has several engineering challenges to overcome. The white reflection from the TFT metal lines, meant for use in transmissive displays, tends to wash out color from the underlying plasmonic surface. A black matrix needs to be superimposed on TFT metal lines to mitigate this. Alternatively, fabrication of the plasmonic surface on the TFT glass itself will solve this unwanted reflection problem. Secondly, the off-the-shelf TFT drivers only source ~10 $V_{rms}$; not enough for the surface's transition to green for the present cell gap of 8.5 μm. TFT drivers capable of sourcing 15-20 V are needed in conjunction with a reduction in cell gap. The voltage needed for saturation is proportional to the thickness of the LC layer, but changes in this gap will alter the intermediate-voltage optical properties of the device. With proper engineering of these parameters we believe the max operating voltage of the cell can be greatly reduced while maintaining its color changing functionality. In absence of the required TFT in present academic setting, a passively addressed device is shown in FIG. 6(d). Here, UV lithography is performed to macroscopically pattern the nanostructured surface, which is followed by a blanket deposition of aluminum. Treating this surface as the "common," we pattern the top ITO glass to have individual control of each letter in "UCF." Furthermore, we utilize a UV photoalignment material (PAAD-22, Beam Co.) instead of a physically rubbed polyimide to demonstrate how the off-state colors can be varied throughout a single device and with a single laminated polarizer. This azobenzene based material, when exposed with linearly polarized UV light, aligns the LC homogeneously and perpendicularly to the polarization of exposure. Here, the alignment layer above the "U" is exposed orthogonally with respect to the polarization of exposure above the "CF." The segmented top ITO/photoalignment substrate is then aligned with the "UCF" plasmonic surface and the resulting cell is infiltrated with LCM1107. By changing the orientation of the LC alignment director with respect to the top polarizer, the "U" and the "CF" change between orthogonal colors. Lastly, we apply a field across the "C" to obtain a green and demonstrate how the three RGB basis colors can be obtained from a single nanostructure/pixel. Lastly, the unoptimized switching characteristics of the device are shown in Supplementary FIG. 5 and show voltage dependent rise and fall times. Full cycling times are somewhat invariant to voltage and in the 70 ms range, which equates to ~14 Hz. While it is believed that this can be improved to standard display frame rates, it remains orders of magnitude faster than other reported color changing technologies such as electrochemical or translocation based methods, which take seconds to tens of seconds to change.

Discussion

In summary, a polarization dependent LC-plasmonic system capable of producing the RGB color basis set as a function of voltage and from a single surface, for the first time, has been produced. This is achieved using a single, continuous, aluminum nanostructure in conjunction with a high birefringence LC. By controlling the deposition conditions of the aluminum, a surface roughness induced polarization dependence is realized in the presence of a surrounding anisotropic media. This phenomena is then exploited through its integration with a LC cell that performs as a polarization rotator at low voltages while shifting the plasmonic resonance of the aluminum nanostructure at higher voltages. Large area nanoimprint lithography based scalable fabrication of the nanostructure combined with its ready integration with LC technology can lead to a new class of LC-plasmonic devices.

Methods

Fabrication of Nanostructured Surfaces

The nanostructured surface is fabricated through nanoimprint lithography (NIL) for rapid replication. A polymer (dimethylsiloxane) (PDMS; Dow Corning, Sylgard) stamp is cast from a master that has been made from beam lithography (EBL). A thin film of SU-8 2000.5 (MicroChem) was spun (500 rpm for 5 s followed by 3000 rpm for 30 s), then prebaked at 95° C. for 1 min. This film is imprinted with the PDMS stamp (20 s) on the hotplate. The stamp and substrate are removed from the hotplate and allowed to cool (30 s). After stamp delamination, the substrate is UV cured (1 min) and post exposure baked (95° C. for 1 min).

Electron Beam Deposition

The 30 nm Al films are deposited using a Temescal (FC-2000) six-pocket electron beam evaporation system. For the "smooth" film studied in FIGS. 2(c) and (e), the sample is mounted on a thermal electric cooler (TEC) and brought to −20° C. Evaporations are done at pressures of ~6×10$^{-6}$ T and deposition rates of ~0.1 nm s$_{-1}$. For the "rough" film used in FIGS. 2(d) and (f) and throughout the rest of this disclosure, the samples are evaporated at room temperature and starting pressures of ~1×10$^{-5}$ T. Before deposition, three edges of the sample were masked off. This greatly reduces the chance of a short circuit in the completed liquid crystal cell.

LC Cell Formation

The plasmonic LC cell is fabricated using commercially available twisted nematic LC cells (AWAT PPW, Poland). The commercial cells are heated to 200° C. and then split into two rubbed-polyimide ITO coated glass slides with 8 μm silica spacers. A single slide is adhered to the plasmonic surface sample using NOA 81 with the polyimide alignment parallel to the nanostructure grating vector. Once UV cured, the LC-plasmonic cell is infiltrated with LC (LCM1107, LC Matter Corp.). The LC cells are driven with a 1 kHz AC sine wave to reduce ion migration. All reported voltages are RMS values unless stated otherwise.

Optical Measurements and Images

Reflection spectra are collected using a 4×, 0.07 numerical aperture objective on an optical microscope (Hyperion 1000) coupled to a Fourier transform infrared spectrometer (Vertex 80). Reflection spectra are normalized to an aluminum mirror with 96% reflectivity and a linear polarizer. Images are collected using the same optical microscope with an Infinity 2-5 camera. Defects due to stamp damage have been replaced by the nearest area in FIG. 5(d) with the GIMP software package.

Finite Difference Time Domain Modeling

Reflection spectra are calculated using experimental parameters for the printed 2D grating structures, with commercial finite-difference time-domain (FDTD) software package (Lumerical FDTD, Lumerical Solutions Inc.). The profile for the electromagnetic simulations was obtained by fitting an analytical equation to SEMs of the nanostructured surface (FIG. 2(c-d)). Surface roughness profiles are generated in Matlab and imported into the FDTD simulations. The wavelength dependent refractive index of aluminum is taken from Palik and the anisotropic parameters of the LC layer are obtained using an effective anisotropic index model based on the orientation of LC obtained from FEM calculations.

Watershed-Based Grain Size Determination

Matlab's inbuilt watershed algorithm finds and labels regions surrounded by lines of local minima, or "watershed ridge lines" of arbitrary matrices. We use this generalized method on SEM images to identify grains of an aluminum film and their size. In order to effectively use the function, several image processing steps must be completed with care so that they do not influence the results of the grain size determination.

The method is as follows:
1) Define a pixel-to-nm length conversion factor.
2) Normalize possibly uneven background through Top-hat filtering.
3) Optional 2D interpolation (will impact pixel to length conversion).
4) Gaussian Filter to eliminate static noise (filter must be much smaller than grain size but larger than static noise of image).
5) Find complimentary image.
6) Suppress all image minima less than the noise floor of the image.
7) Apply watershed algorithm to find local regions surrounded by lines of local minima and their size.
8) Superimpose watershed result on image to verify output of function
9) Find histogram of watershed results which gives list of local regions with their respective number of pixels
10) Convert number of pixels into an area with pixel-to-nm conversion factor.
11) As grains are of random shapes, assume grains are spheroidal and obtain diameter of respective circle given area.
12) Gaussian fit the resulting histogram plot.

Supplementary FIG. 1 shows the input SEM images for the "rough" and "smooth" aluminum thin film at various steps in the watershed method. The method results in a list of regions with the number of pixels they contain. The area of each region is then converted into an approximate grain diameter. Regions are mapped back on the image in the form of white lines to confirm the methods functionality.

Figures 8A, 8B, 8C:
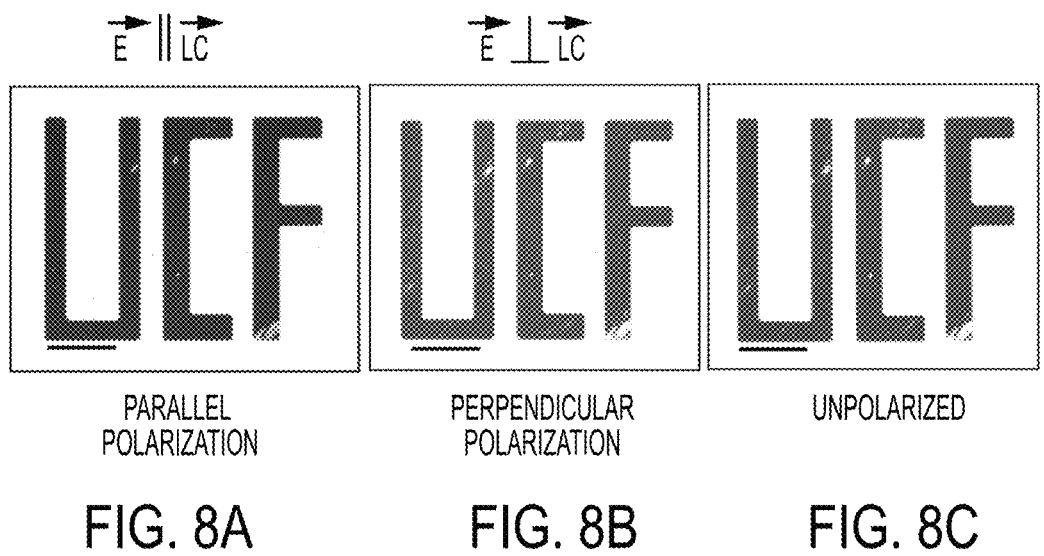
FIG. 8(a) is a depiction of the off-state behavior of the surface results in a blue color when the electric field of incident light is parallel.
FIG. 8(b) is a depiction of the off-state behavior of the surface results in a red color when the electric field of incident light is perpendicular.
FIG. 8(c) is a depiction of the off-state behavior of the surface resulting in a purple color when unpolarized.

FIGS. 8(a-b) shows the off-state behavior of the surface results in blue or red when the electric field of incident light is parallel (FIG. 8(a)) or perpendicular (FIG. 8(b)) to the top LC alignment director, respectively. Without a polarizer, the device reflects a superposition of the two orthogonal polarization colors, resulting in a purple color (FIG. 8(c)).

LC Modeling and Jones Matrix Method

Figures 9A, 9B:
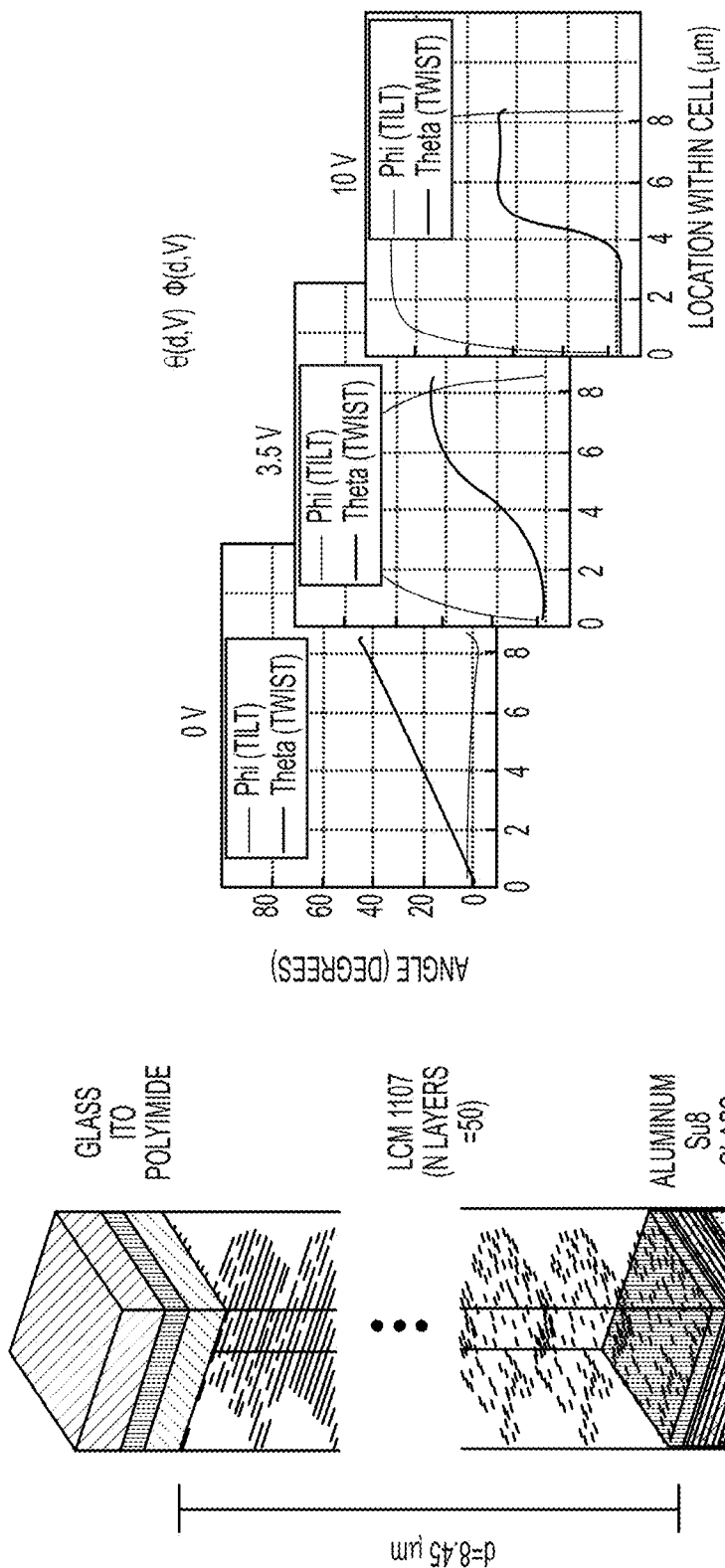
FIG. 9(a) is a schematic representation of a unit cell of a simulated nano-well array.
FIG. 9(b) is a series of graphs showing the resulting φ and θ from FIG. 9(a) as a function of the cell position and voltage.

The bulk LC dynamics are simulated using the TechWiz LCD 3D (Sanayi) software package. The Finite Element Method (FEM) solver finds the minimum energy state of the LC director given LC material parameters, boundary conditions and applied voltages. A unit cell of the simulated nano-well array can be seen in FIG. 9(a), where the LC layer is approximated with 50 layers, which has been found to give well converged results. The simulations are run in increments of 0.1 V and result in LC director tensors that represent the LC orientation throughout the cell. We then convert this data into the "tilt" (θ) and "twist" (φ) angles of the LC, which can be seen in FIG. 9(b). These simulation results will then be used in a Jones Matrix formulation to find the optical behavior of the LC cell.

Once the direction of the LC throughout the cell is known, a Jones Matrix formulation is used to solve for the cell's optical properties. This is done by approximating the LC layer as a stack of N uniaxial crystals and combining their transfer matrices, $$LC_j = \prod_{j=1}^{N} M_j \tag{1}$$

where $$M_j = Rot(-\varphi) * \begin{bmatrix} e^{-i\frac{g_j}{2}} & 0 \\ 0 & e^{i\frac{g_j}{2}} \end{bmatrix} Rot(\varphi). \tag{2}$$

Here, Rot is the rotation matrix and φ is the twist angle of the LC for a given layer j.

$$Rot(\varphi) = \begin{bmatrix} \cos(\varphi) & \sin(\varphi) \\ -\sin(\varphi) & \cos(\varphi) \end{bmatrix} \tag{3}$$

and $$g_j = \frac{2\pi}{\lambda} \Delta n_j d_j. \tag{4}$$

This phase term depends on the thickness, $d_j$, and birefringence, $\Delta n_j$, of each individual layer j. The birefringence is given by $$\Delta n_j = n_e(\theta_j) - n_o \tag{5}$$

where $n_e(\theta_j)$ is the effective extraordinary index of the LC given a tilt angle of $\theta_j$ $$\frac{1}{n_e^2(\theta)} = \frac{\cos^2(\theta)}{n_e^2} + \frac{\cos^2(\theta)}{n_o^2}. \tag{6}$$

Here, $n_e$ and $n_o$ are the extraordinary and ordinary indices of the liquid crystal.

To find the strength and phase of light at each layer, we iteratively perform the above matrix multiplication for incident light that is parallel to the top LC alignment director and which we define in the x-direction.

$$\begin{bmatrix} E_x \\ E_y \end{bmatrix} j = LCj \begin{bmatrix} 1 \\ 0 \end{bmatrix} \quad (7)$$

We then use this to find the E-field that excites the plasmonic surface. To determine the amount of each orthogonal mode of the surface that's excited, we project the exciting light on the states of the surface which are defined by the in-plane angle of the LC atop it, $$\theta_N \sim = \frac{\pi}{4}.$$

$$\alpha = |\langle \psi_1 | LC_N | E_{in} \rangle| \quad (8)$$

$$\beta = |\langle \psi_2 | LC_N | E_{in} \rangle| \quad (9)$$

This results in wavelength and voltage dependent weighting factors, $\alpha$ and $\beta$, such that the reflection spectra of the surface in the low voltage regime, where bulk LC deforms but remains anchored LC on aluminum surface, is a superposition of the two orthogonal off-state modes.

$$|\psi_v\rangle = \alpha |\psi_1\rangle + \beta |\psi_2\rangle \quad (10)$$

These weighting terms also satisfy the following condition.

$$\alpha^2 + \beta^2 = 1 \quad (11)$$

Figure 10B:
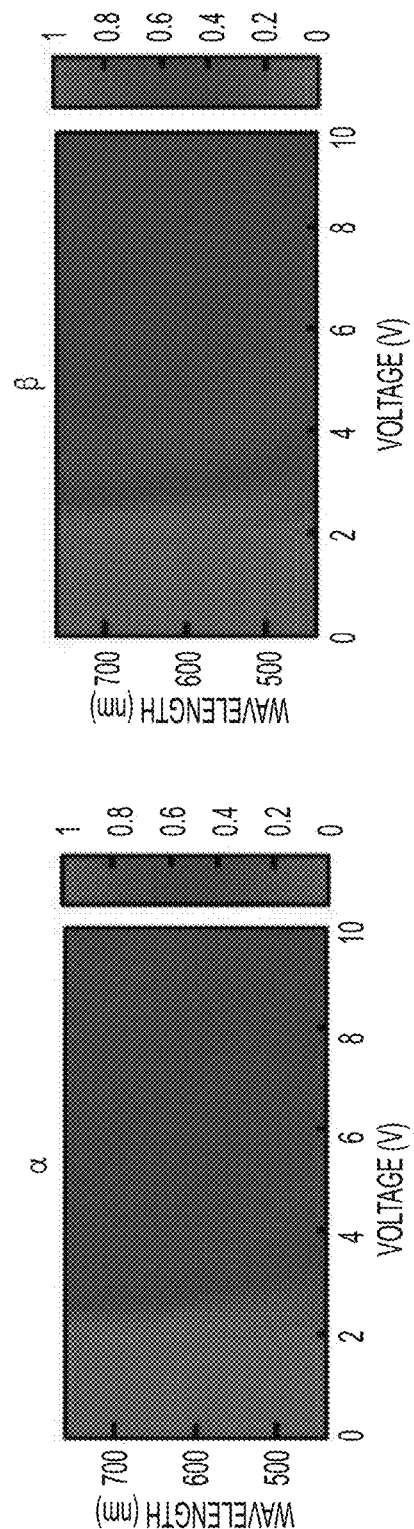
FIG. 10b) is a graph showing the wavelength and voltage dependent weighting factors for β.
Figure 10A:
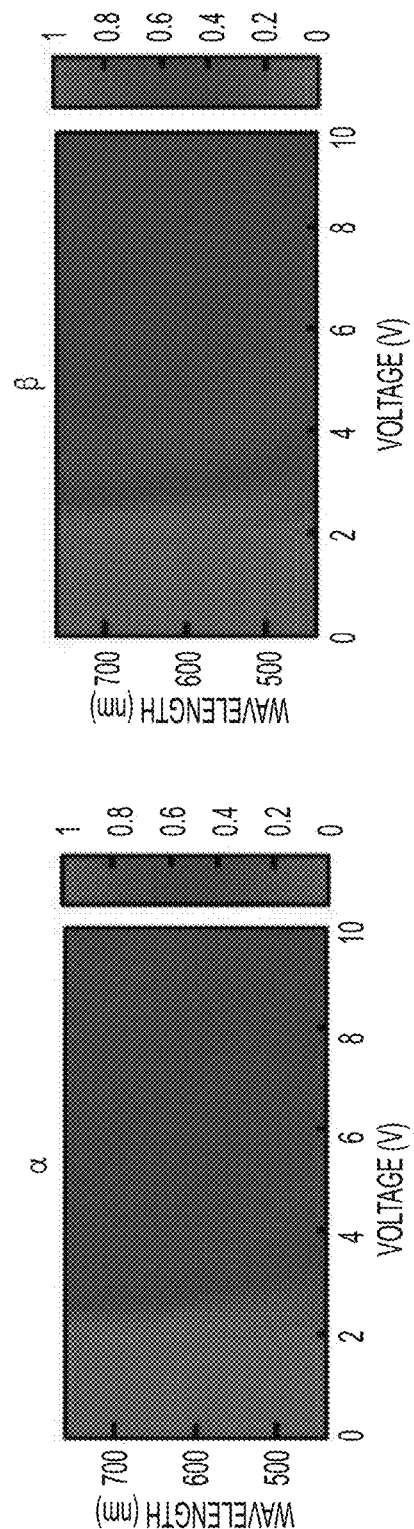
FIG. 10(a) is a graph showing the wavelength and voltage dependent weighting factors for φ.

The resulting $\alpha$ and $\beta$ are shown in FIG. 10(a-b), respectively. Here, an effective flipping occurs within the 3.5 V to 4 V region. These weighting values are used on the two orthogonal off-state reflection spectra of the surface to closely match experimental measured spectra at this flipping region, as seen in FIG. 3(e). While in FIG. 4(a), these weighting terms are applied to the FDTD simulated reflection spectra for the surface's two orthogonal off state modes.

To complete the model and find the reflection out of the device, we must consider reflection, a reverse pass through the LC and exit through the polarizer. It is possible to incorporate these into the matrix method by using the transfer matrix method in reverse, or by using the following, which is based on the symmetry of the system.

$$R = \left| [\cos\varphi_1 \ \sin\varphi_1] H M H^{-1} M \begin{bmatrix} \cos\varphi_1 \\ \sin\varphi_1 \end{bmatrix} \right|^2 \quad (12)$$

Where is given by.

$$H = \begin{bmatrix} \cos\varphi_N & \sin\varphi_N \\ \sin\varphi_N & -\cos\varphi_N \end{bmatrix} \quad (13)$$

Figure 11A:
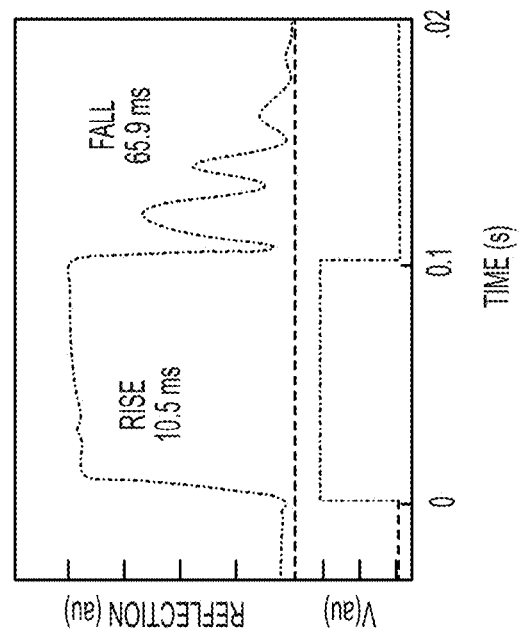
FIG. 11(a) is a graph showing response time measurements for 2.6 V (1 kHz AC)
Figure 11B:
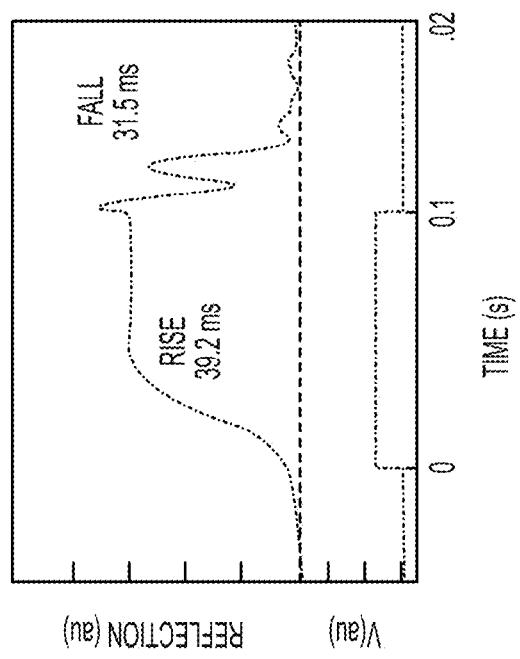
FIG. 11(b) is a graph showing response time measurements for 5.4 V (1 kHz AC)
Figure 12A:
FIG. 12(a) is an optical micrograph at 0 V/μm of a singular Afghan Girl image (National Geographic Society) as a function of applied electric field.
Figure 12B:
FIG. 12(b) is another optical micrograph at 1.25 V/μm of a singular Afghan Girl image (National Geographic Society) as a function of applied electric field.
Figure 12C:
FIG. 12(c) is an optical micrograph at 2.5 V/μm of a singular Afghan Girl image (National Geographic Society) as a function of applied electric field.
Figure 12D:
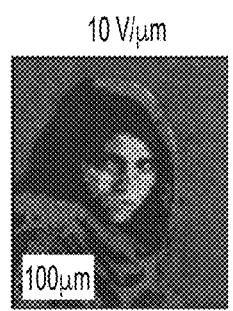
FIG. 12(d) is an optical micrograph at 10 V/μm of a singular Afghan Girl image (National Geographic Society) as a function of applied electric field.
Figure 12E:
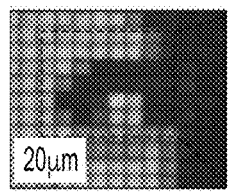
FIG. 12(e) is an optical micrograph at 10 V/μm in FIG. 12(d) with 10× objective.
Figure 12F:
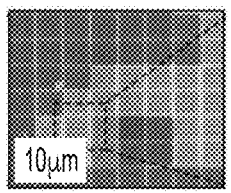
FIG. 12(f) is a SEM image of the sample before fabrication into a liquid crystal cell.
Figure 12G:
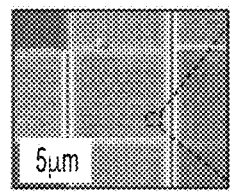
FIG. 12(g) is another SEM image of the sample before fabrication into a liquid crystal cell.
Figure 12H:
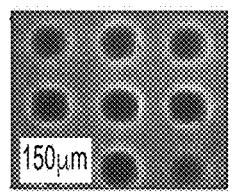
FIG. 12(h) is yet another SEM image of the sample before fabrication into a liquid crystal cell.

FIGS. 11(a-b) shows response time measurements. Using the experimental setup outlined in FIG. 3(b) (633 nm He—Ne laser, polarizing beam splitter and photodiode), measurements of response time are shown for (a) 2.6 V and (b) 5.4 V (1 kHz AC). These give total switching times of 70.7 ms and 76.4 ms, respectively. Cell gaps are 8.45 μm.

Actively Tunable Structural Color based on Liquid Crystal—Plasmonic Surfaces (PRV)

FIG. 12 demonstrates actively tunable structural color based on Liquid Crystal—Plasmonic Surfaces (PRV). FIGS. 12(a-h) show dynamic color tuning of arbitrary images. FIGS. 12(a-d) show optical micrographs of a singular Afghan Girl image (National Geographic Society) as a function of applied electric field. Nanostructure periods are chosen so colors match the original photograph at color tuning saturation, 10 V/μm. Defects due to fabrication errors have been replaced by nearest neighbors. FIG. 12(e) show optical micrograph at 10 V/μm with 10× objective shows pixilation of the image. FIG. 12(f-h) show SEM images of the sample before fabrication into a liquid crystal cell. The series shows the constituent nanostructure of individual pixels.

The embodied device enables the surface of each pixel to dynamically change color. This eliminates the need for subpixels, increasing the resolution of any screen by 66% while using the exact same thin film transistor (TFT) array and electronics. This large increase in resolution, without the added cost and difficulty of manufacturing smaller electronics, give this technology the potential to be truly disruptive.

All references, including publications, patent applications, and patents cited herein are hereby incorporated by reference in their entireties to the same extent as if each reference was individually and specifically indicated to be incorporated by reference and were set forth in its entirety herein.

The use of the terms "a", "an", "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it was individually recited herein with an uncertainty unless otherwise indicated of +/−20 percent.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

REFERENCES INCORPORATED BY REFERENCE

1 James, T. D., Mulvaney, P. & Roberts, A. The Plasmonic Pixel: Large Area, Wide Gamut Color Reproduction Using Aluminum Nanostructures. Nano letters 16, 3817-3823, doi:10.1021/acs.nanolett.6b01250 (2016).
2. Goh, X. M., Ng, R. J. H., Wang, S., Tan, S. J. & Yang, J. K. W. Comparative Study of Plasmonic Colors from All-Metal Structures of Posts and Pits. Acs Photonics 3, 1000-1009, doi:10.1021/acsphotonics.6b00099 (2016).
3. Cheng, F., Gao, J., Luk, T. S. & Yang, X. Structural color printing based on plasmonic metasurfaces of perfect light absorption. Scientific reports 5, 11045, doi:10.1038/srep11045 (2015).
4. Huang, Y. W. et al. Aluminum plasmonic multicolor meta-hologram. Nano letters 15, 3122-3127, doi:10.1021/acs.nanolett.5b00184 (2015).
5. Tan, S. J. et al. Plasmonic color palettes for photorealistic printing with aluminum nanostructures. Nano letters 14, 4023-4029, doi:10.1021/nl501460x (2014).
6. Shrestha, V. R., Lee, S. S., Kim, E. S. & Choi, D. Y. Aluminum plasmonics based highly transmissive polarization-independent subtractive color filters exploiting a nanopatch array. Nano letters 14, 6672-6678, doi:10.1021/nl503353z (2014).
7. Lu, B. R., Xu, C., Liao, J., Liu, J. & Chen, Y. High-resolution plasmonic structural colors from nanohole arrays with bottom metal disks. Opt Lett 41, 1400-1403, doi:10.1364/OL.41.001400 (2016).
8. Li, Z. Y., Butun, S. & Aydin, K. Large-Area, Lithography-Free Super Absorbers and Color Filters at Visible Frequencies Using Ultrathin Metallic Films. Acs Photonics 2, 183-188, doi:10.1021/ph500410u (2015).
9. Zhu, X., Vannahme, C., Hojlund-Nielsen, E., Mortensen, N. A. & Kristensen, A. Plasmonic colour laser printing. Nat Nanotechnol 11, 325-329, doi:10.1038/nnano.2015.285 (2016).
10. Raj Shrestha, V., Lee, S. S., Kim, E. S. & Choi, D. Y. Polarization-tuned Dynamic Color Filters Incorporating a Dielectric-loaded Aluminum Nanowire Array. Scientific reports 5, 12450, doi:10.1038/srep12450 (2015).
11. Xue, J. et al. Scalable, full-colour and controllable chromotropic plasmonic printing. Nature communications 6, 8906, doi:10.1038/ncomms9906 (2015).
12. Fang, Z. Y., Zhen, Y. R., Fan, L. R., Zhu, X. & Nordlander, P. Tunable wide-angle plasmonic perfect absorber at visible frequencies. Phys Rev B 85, doi:ARTN 245401 10.1103/PhysRevB.85.245401 (2012).
13. Olson, J. et al. Vivid, full-color aluminum plasmonic pixels. Proceedings of the National Academy of Sciences of the United States of America, doi:10.1073/pnas.1415970111 (2014).
14. Lee, K. T., Seo, S. & Guo, L. J. High-Color-Purity Subtractive Color Filters with a Wide Viewing Angle Based on Plasmonic Perfect Absorbers. Advanced Optical Materials 3, 347-352, doi:10.1002/adom.201400533 (2015).
15. Wu, Y. K., Hollowell, A. E., Zhang, C. & Guo, L. J. Angle-insensitive structural colours based on metallic nanocavities and coloured pixels beyond the diffraction limit. Scientific reports 3, 1194, doi:10.1038/srep01194 (2013).
16. Kaplan, A. F., Xu, T. & Guo, L. J. High efficiency resonance-based spectrum filters with tunable transmission bandwidth fabricated using nanoimprint lithography. Appl Phys Lett 99, doi:10.1063/1.3647633 (2011).
17. Franklin, D. et al. Polarization-independent actively tunable colour generation on imprinted plasmonic surfaces. Nature communications 6, 7337, doi:10.1038/ncomms8337 (2015).
18. Schadt, M. Voltage-Dependent Optical Activity of a Twisted Nematic Liquid Crystal. Appl Phys Lett 18, 127, doi:10.1063/1.1653593 (1971).
19. Malyarchuk, V. et al. High performance plasmonic crystal sensor formed by soft nanoimprint lithography. Optics express 13, 5669-5675 (2005).
20. Diest, K., Liberman, V., Lennon, D. M., Welander, P. B. & Rothschild, M. Aluminum plasmonics: optimization of plasmonic properties using liquid-prism-coupled ellipsometry. Optics express 21, 28638-28650, doi:10.1364/Oe.21.028638 (2013).
21. Knight, M. W. et al. Aluminum for plasmonics. Acs Nano 8, 834-840, doi:10.1021/nn405495q (2014).
22. Tillin, M. D. & Sambles, J. R. A Surface Plasmon-Polariton Study of the Dielectric-Constants of Reactive Metals—Aluminum. Thin Solid Films 167, 73-83, doi: Doi 10.1016/0040-6090(88)90483-X (1988).
23. Yeh, P. Extended Jones matrix method. Journal of the Optical Society of America 72, 507, doi:10.1364/josa.72.000507 (1982).
24. Tang, S. T. et al. Reflective twisted nematic liquid crystal displays. I. Retardation compensation. J Appl Phys 81, 5924, doi:10.1063/1.364379 (1997).
25. Schadt, M., Schmitt, K., Kozinkov, V. & Chigrinov, V. Surface-Induced Parallel Alignment of Liquid-Crystals by Linearly Polymerized Photopolymers. Japanese Journal of Applied Physics Part 1-Regular Papers Short Notes & Review Papers 31, 2155-2164, doi:Doi 10.1143/Jjap.31.2155 (1992).
26. Kim, H. et al. Structural colour printing using a magnetically tunable and lithographically fixable photonic crystal. Nat Photonics 3, 534-540, doi:10.1038/Nphoton.2009.141 (2009).
27. Arsenault, A. C., Puzzo, D. P., Manners, I. & Ozin, G. A. Photonic-crystal full-colour displays. Nat Photonics 1, 468-472, doi:10.1038/nphoton.2007.140 (2007).

What is claimed is:

1. A liquid crystal-plasmonic display apparatus, comprising:
    a linear polarizer;
    a superstrate;
    a transparent electrode;
    a rubbed polyimide film;
    a liquid crystal (LC); and
    a nano-structured plasmonic surface disposed on a substrate,
    where the transparent electrode is disposed to apply an electric field across the liquid crystal, and the rubbed polyimide aligns the LC parallel to the axis it is rubbed to provide homogeneous alignment,
    wherein the LC orientation near the plasmonic surface determines the effective refractive index of polarization-sensitive, grating-coupled surface plasmon (GCSP) modes and,
    therefore, the resonant wavelength of the nano-structured plasmonic surface,
    further wherein the apparatus is characterized by a reflective color changing surface capable of producing the full RGB color basis set, all as a function only of voltage and based on a single nanostructure.

2. The apparatus of claim 1, wherein the nano-structured plasmonic surface is a rough surface, inducing polarization dependence on the GSCP resonance in the presence of an anistropic media.

3. The apparatus of claim 1, wherein the nano-structured plasmonic surface is a smooth surface, resulting in substantial polarization independence.

4. The apparatus of claim 1, wherein the LC is a cell having at least a portion thereof comprised of the nano-structured plasmonic surface.

5. The apparatus of claim 1, wherein the nano-structured plasmonic surface is a nano-structured aluminum surface.

6. The apparatus of claim 1, wherein the superstrate is a glass composition.

7. The apparatus of claim 1, wherein the transparent electrode comprises indium tin oxide (ITO).

8. The apparatus of claim 1, further comprising a cell gap of the LC measuring approximately 8.5 µm.

9. A method of displaying a tunable color image, comprising:
  providing the liquid crystal-plasmonic display apparatus of claim 1;
  transmitting incident unpolarized ambient light through the linear polarizer, the superstrate, the transparent electrode, and the rubbed polyimide film, wherein the incident unpolarized light becomes polarized, passes through the LC, and excites grating coupled surface plasmons (GSCP) on the nanostructured surface;
  applying a voltage across the plasmonic surface and the transparent electrode, thereby controlling the orientation of the LC throughout the cell; and
  varying the voltage between a low and a high range.

10. The method of claim 9, further comprising the step of adjusting the angle of the linear polarizer in relation to the LC.

11. The method of claim 9, further comprising the step of aligning the linear polarizer parallel to the LC.

12. The method of claim 11, further comprising the step of reflecting a blue color from the liquid crystal-plasmonic display apparatus.

13. The method of claim 9, further comprising the step of aligning the linear polarizer perpendicular to the LC.

14. The method of claim 13, further comprising the step of reflecting red color from the liquid crystal-plasmonic display apparatus.

15. The method of claim 9, wherein the nano-structured plasmonic surface is a nano-structured aluminum surface.

16. The method of claim 9, wherein the superstrate is a glass composition.

17. The method of claim 9, wherein the transparent electrode comprises indium tin oxide (ITO).

* * * * *